INVENTOR.
ALONZO ROBERT TURNER
BY
ATT'YS.

May 22, 1956  A. R. TURNER  2,746,042
PORTABLE STAPLING MACHINE
Filed Oct. 20, 1951  7 Sheets-Sheet 3

INVENTOR.
ALONZO ROBERT TURNER
BY
ATT'YS.

May 22, 1956  A. R. TURNER  2,746,042
PORTABLE STAPLING MACHINE
Filed Oct. 20, 1951  7 Sheets-Sheet 4

Fig. 21

Inventor
Alonzo Robert Turner
By: Wilson & Eppert Attys

May 22, 1956  A. R. TURNER  2,746,042
PORTABLE STAPLING MACHINE
Filed Oct. 20, 1951  7 Sheets-Sheet 5

Inventor
Alonzo Robert Turner,
By: Wilson & Geppert
Attys.

May 22, 1956 A. R. TURNER 2,746,042
PORTABLE STAPLING MACHINE
Filed Oct. 20, 1951 7 Sheets-Sheet 6

May 22, 1956  A. R. TURNER  2,746,042
PORTABLE STAPLING MACHINE
Filed Oct. 20, 1951  7 Sheets-Sheet 7

Inventor
Alonzo Robert Turner,
By Wilson T Geppert Attys

United States Patent Office 2,746,042
Patented May 22, 1956

2,746,042

PORTABLE STAPLING MACHINE

Alonzo Robert Turner, Cottage Grove, Wis.

Application October 20, 1951, Serial No. 252,290

15 Claims. (Cl. 1—44.4)

The present invention relates to stapling machines and more particularly to a novel portable stapling machine of the type adapted for stapling the closures of relatively large containers including corrugated or cardboard boxes and the like, and also to anchor steel strapping, wire, insulation, etc., to wood or other material or wherever a heavy impact is required to embed and clinch the staple.

The present invention comprehends a novel portable stapling machine of the type that may be readily and easily carried about and the stapling operation manually initiated but requiring a minimum of effort on the part of the operator.

A further and important object of the present invention is the provision of a novel means and mechanism in a portable stapling machine for securing a heavy impact or force for driving the staple and clinching the ends thereof in a novel manner and with results far superior to those accomplished by any of the present commercial types of stapling machines.

Another important object of the present invention is the provision of a novel stapling assembly having a novel tripping mechanism and manner of supplying an impact force for impelling a staple driver or stapling member whereby to most effectively drive and clinch the staple as it is embedded and assure a solid clinch.

The present invention further comprehends a novel construction and arrangement of portable stapler which is of relatively light weight yet of great inherent strength and capable of driving a staple and clinching it with an impact or force that relieves most of the manual effort and assures optimum efficiency. By reason of this novel construction, it may be easily, quickly and safely operated by a female operator with little effort.

Another important object of the present invention is the provision of a novel stapling device that embeds and clinches the driven staples with a minimum of mutilation to the container and without damage to its contents. Unlike prior types of portable staplers and the staples employed therewith, the embedding and clinching ends of the present staples are not arched and the present device has no anvils that swing or pivot into the carton or container and no lateral actuating dies; consequently the size of the openings made in the embedding and clinching operation is small.

A further object of the present invention is to provide a novel stapling machine in which the staple is embedded and clinched in such manner that no portion thereof projects above the surface of the carton or container. This countersinking permits the stapled cartons or containers to be readily and solidly stacked and slid or shifted laterally without interference or engagement with projecting staples.

Another important object of the present invention is the provision of novel stapling machine and staple adapted for anchoring steel strapping, wire, insulation and other material to a base of wood, plywood, fibreboard, etc. By means of the present machine and form of staple, substantial saving is effected in the length of staples and the amount of metal required.

The present invention also comprehends a novel portable stapling machine that is manually controlled but power actuated either through mechanical means or pneumatically.

A further and very important object is the provision of a novel staple designed and constructed in such manner as to insure uniformly excellent results.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Fig. 7 is a fragmentary enlarged view showing the position and relationship of the cam and the associated end of the actuating rod and trip or pull arms when the handle is elevated and the parts of the stapling assembly are in the inoperative position shown in Fig. 5.

Fig. 8 is a view similar to Fig. 7 but disclosing the position of the cam and the roller of the actuating rod when the handle is being lowered to retract the trip or pull arms and to release the stapling mechanism for a stapling operation as disclosed in Fig. 4.

Fig. 9 is a substantially vertical cross sectional view taken approximately on the line 9—9 of Fig. 4 and viewed in the direction of the arrows.

Figs. 11 to 18, inclusive, are fragmentary vertical cross sectional views through the stapler housing and showing the lower end of the staple driver or stapling plate, the anvil tip and a staple in side elevation and showing the successive steps involved in driving and clinching the staple about the anvil tip.

Fig. 19 is a view similar to Figs. 11 to 18, inclusive, but showing an alternate form of staple driver for use in embedding a staple into wood, plywood, fibreboard or other material for anchoring thereto a steel strap, wire insulation, etc.

Figs. 31 to 37, inclusive, are fragmentary views in side elevation showing the positioning and arrangement of the staple driver, the anvil tips and a staple, and showing successive stages or steps involved in driving, forming and clinching a staple about the anvil tips whereby to anchor or secure the closure flaps of a cardboard or corrugated box or container.

Figs. 39, 40 and 41 are fragmentary views in side elevation showing an alternate form of staple driver in the form of a flat plate for driving and anchoring a staple into wood, plywood, fibreboard or other relatively rigid material to anchor or secure thereto a metal strap, insulation or the like.

Figure 4:
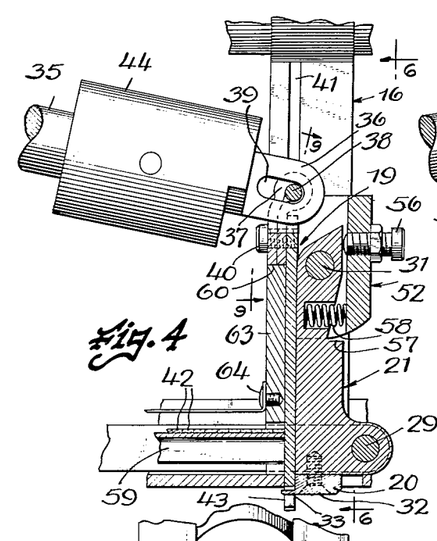
Fig. 4 is a fragmentary enlarged view in vertical cross section through the stapler head assembly and showing in vertical cross section the staple driver for embedding and clinching successive staples, the tripping mechanism and the anvil assembly, these parts all being shown in their lowered, stapling position which operation is initiated when the handle is depressed.

Referring to the disclosure in the drawings and more particularly to the novel illustrative embodiment of Figs. 1 to 20, inclusive, wherein is disclosed a portable and manual or hand actuated stapling machine having a housing or support including a base 10 having an upstanding flange 11, a substantially U-shaped tubular frame 12 having its rearwardly and downwardly projecting ends 13 secured or anchored to the upstanding flange 11 of the base by screws or other attaching means 14. The forward end 15 of the tubular frame is shown supported upon spaced uprights 16 by anchoring straps or the like 17, these spaced uprights providing the opposite sides of an operating head housing a trip mechanism 18, a staple driver 19, an anvil 20 and a holder or support therefor 21 (Figs. 4, 5 and 6) to which the anvil is removably but rigidly secured.

Figure 6:
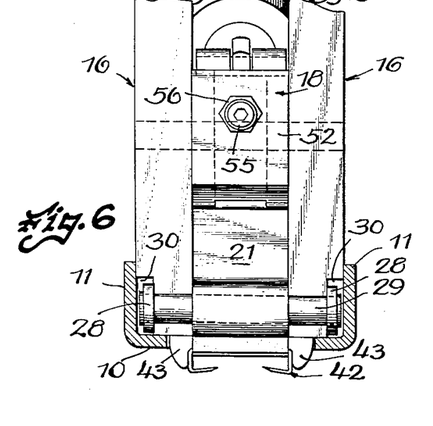
Fig. 6 is a view in front elevation of the stapler head assembly of Fig. 4 with the staple driver lowered and showing the staple in clinched position, the view being taken on the line 6—6 of Fig. 4 and viewed in the direction of the arrows.

Pivotally mounted upon a cross pin 22 (Figs. 1, 7 and 8) is a cam member 23 affixed or secured to the rear end 24 of a handle 25 by screws or other suitable attaching means. Secured to this cam member by a cross pin 26 is one end of a pair of spaced trip arms or pull rods 27 with the other or outer end 28 of these arms connected by a cross pin 29 to adjacent the lower and forward end of the anvil holder 21. The ends 28 of the trip arms 27 are longitudinally movable over the base 10 and adjacent the flanges 11, the uprights 16 being cut away at 30 to accommodate the ends 28 (Fig. 6).

The anvil holder 21 is pivotally mounted adjacent its upper end on a transverse shaft or pin 31 and carries at its lower end a hardened steel or metal plate forming the anvil 20 secured thereto by bolts 32 and provided with spaced, substantially horizontally disposed and rearwardly projecting anvil tips 33. Moving the trip arms or pull rods 27 rearwardly upon operation of the handle 25 retracts the shaft or pin 29 and the lower end of the anvil holder 21 and its anvil 20.

Also attached to the cam member 23 by the cross pin 22 which is located forwardly of the cross pin 26 to which the rear end of the trip arms or pull rods 27 is attached, is the bifurcated or slotted end 34 (Fig. 3) of an actuating rod 35 with the other or forward end 36 of this rod freely and pivotally attached to a connecting strap 37 by a cross pin 38 slidably received in a longitudinally extending slot 39 in the end 36 of the rod (Figs. 2, 3, 4 and 5). The connector or connecting strap 37 is secured to the upper end of the staple driver 19 by a screw or other attaching means 40. This staple driver is in the form of a flat metal plate having its opposite edges slidably mounted in inwardly opening channels or grooves 41 in the spaced uprights 16, whereby tripping of the anvil holder 21 allows the rod 35 to impel and lower the staple driver or plate with a force or impact sufficient for embedding and clinching a staple 42 disposed in aligned relation with the lower clinching ends 43 of the staple driver 19 (Fig. 6).

To cause a most effective, heavy impact, the present invention comprehends providing the actuating rod 35 adjacent its forward end 36 with a heavy weight 44. Disposed rearwardly of this weight, the rod is encompassed by a relatively heavy compression spring 45 having its forward end seating against the projecting ends of a transverse pin 46 in the rod, and at its rearward end the spring seats against a transverse or cross pin 47 carried in a longitudinal slot 48 in the bifurcations or slotted end 34 of the actuating rod 35. This pin 47 intermediate the bifurcations carries a roller 49 (Figs. 7 and 8) held in contact with the cam face 51 of the cam member 23.

The trip mechanism 18 comprises a channelled or slotted dog or pawl 52 pivotally mounted on the pivot pin 31 in the upper reduced end 54 of the anvil holder 21 and provided with a trip adjustment screw 55 and lock nut 56 to permit ready adjustment at which instant the staple driver or plate 19 is released from its cocked position. Adjusting the screw 55 which is located above and offset with respect to the pivot pin 31, is adapted to adjust the position of the tripping ledge or shoulder 57 at the upper edge of the dog or pawl 52 and which engages the lower end of staple driver 19. A compression spring 58 seated in a recess in the anvil holder 21 and bearing against the dog or pawl 52 biases the lower end of this pawl 52 outwardly or forwardly whereby the upper end thereof is pivoted inwardly to force the ledge or shoulder 57 to occupy a position beneath the staple driver or stapling plate 19 when the latter is raised to its elevated or inoperative position as shown in Fig. 5, but cocked and ready to be tripped when the handle 25 is depressed.

The staples 42 are disposed in aligned relation upon a channel member 59 (Fig. 10) conforming to the shape of the staples and mounted above the base 10 by means of a support and spacer 60. The staples are fed to the stapling mechanism over this channel member by suitable mechanism including a slidable housing 61 (Figs. 1 and 2) enclosing a clockspring having its projecting end 62 secured to a back plate 63 on the stapler head by a screw or other attaching means 64 (Figs. 4 and 5), and a channel-shaped pusher 65 (Fig. 2) substantially conforming to the channel member 59 and abutting the rear or end staple 42 on this member, whereby the successive staples are moved into stapling position beneath the vertically movable female die member 19.

Figure 5:
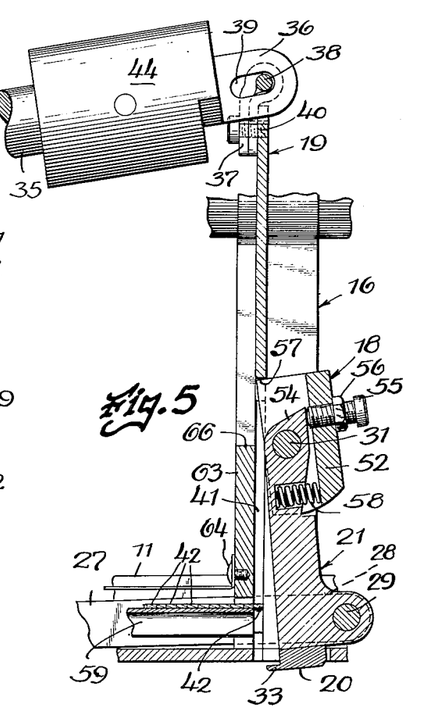
Fig. 5 is a view similar to Fig. 4 but showing the parts in inoperative or cocked position with the staple driver held in elevated position, and prior to depressing the handle from its raised position to trip the staple driver and the anvil assembly.

In the operation of the stapler of Figs. 1 to 20 inclusive, and assuming the parts are in inoperative position with the handle 25 raised to its inoperative position (Fig. 7), the staple driver or stapler plate 19 is in elevated position and the trip mechanism and the anvil assembly are all in the position shown in Fig. 5 ready to be tripped to embed and clinch a staple aligned with the lower end of the staple driver. In this inoperative but cocked position ready to be tripped, the shoulder or ledge 57 on the dog or pawl 52 seats beneath the lower edge of the staple driver or stapler plate 19 and retains it in elevated position.

Figure 1:
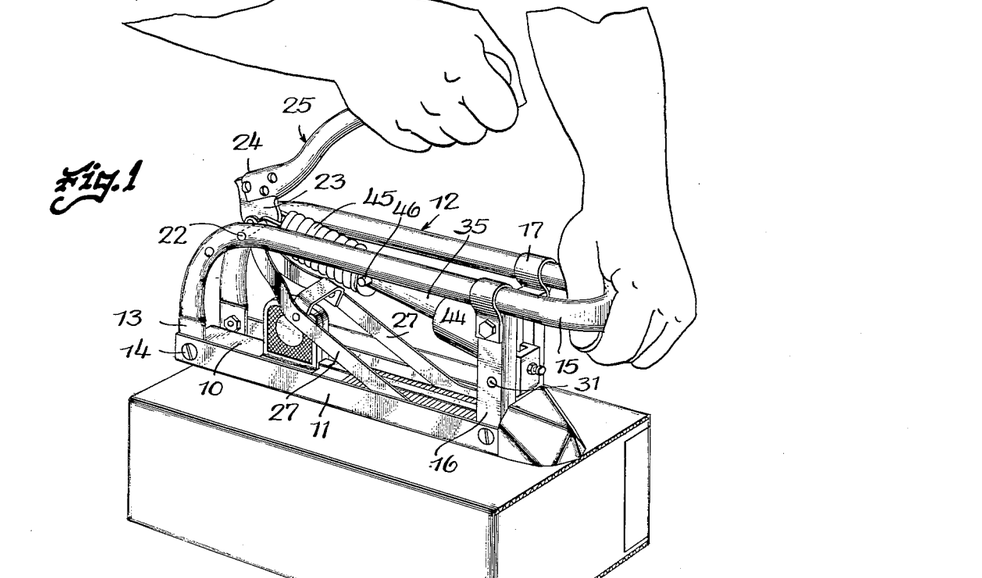
Figure 1 is a view in perspective of the novel manually actuated stapling machine and showing the operator moving the operating handle to stapling position.
Figure 2:
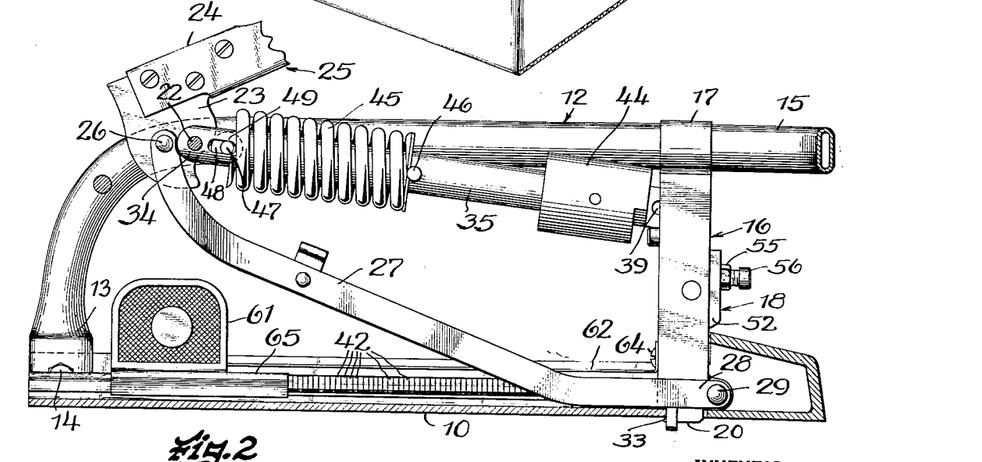
Fig. 2 is a fragmentary enlarged view, part in side elevation and part in vertical cross section, taken longitudinally through the machine shown in Fig 1.
Figure 3:
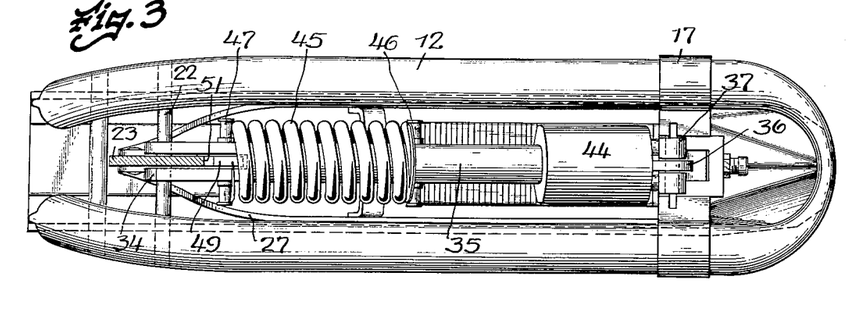
Fig. 3 is a top plan view of the stapling machine but with the handle omitted.
Figures 7, 8, 9, 11, 12, 13, 19:
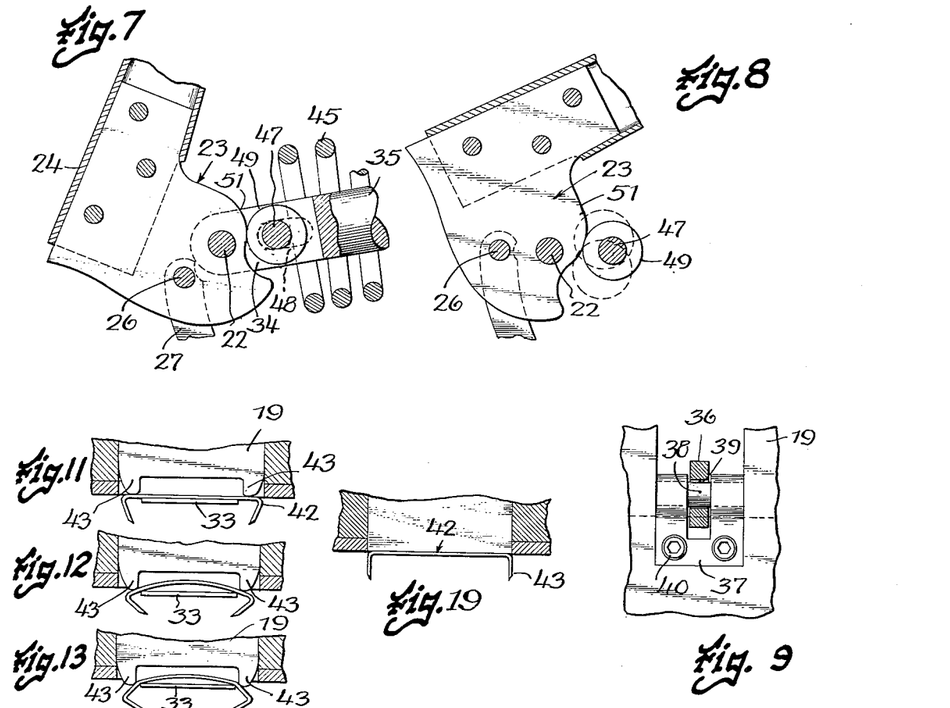
Figures 10, 20:
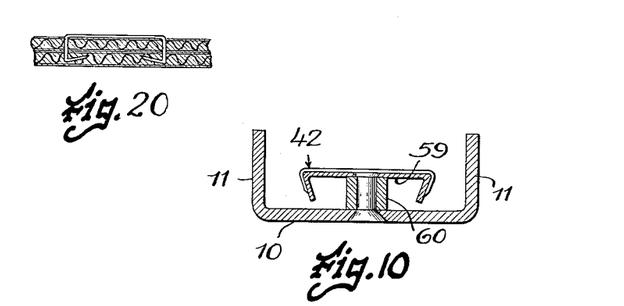
Fig. 10 is a view in vertical cross section taken across or through the base of the unit and the staple channel to show the manner in which the staples may be fed to the stapler mechanism.
Fig. 20 is a fragmentary view showing the staple of Figs. 11 to 18 embedded and clinched in corrugated board but without piercing the lower layer.
Figure 14:
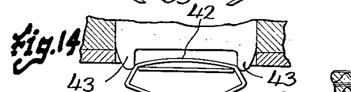

When the handle 25 is depressed as shown in Figs. 1, 2 and 8, the cam 23 compresses the spring 45 and the roller 49 riding over and held in firm pressure contact with the curved cam surface 51 of the cam 23, augments the force applied to the rod 35 by the weight 44 located on the forward end of the rod to impel and cause a heavy impact of the staple driver 19 upon the staple 42 therebeneath. Prior to release of the staple driver 19, downward movement of the handle 25 causes the trip or pull arms 27 to retract the cross pin 29 to pivot or swing the anvil holder 21 in a clockwise direction about the pivot pin 31 thus removing the dog or pawl 52 from beneath the shoulder 57 of the driver 19 (Fig. 5), to the position shown in Fig. 4. This positions the anvil tip 33 directly beneath the depending staple driver 19 and as the latter is released by the trip mechanism, it is forcibly driven downwardly in its guide channels or grooves 41 in the end uprights 16 by the power and impact generated by the actuating rod 35 through its cam action, compression spring 45 and weight 44.

When the plate or staple driver 19 is propelled downwardly, it strikes the overhanging staple 42 (see Fig. 5) and drives it downwardly over the then aligned anvil tip 33 (Fig. 4) and embeds the staple in the corrugated board, heavy paper board or other material being stapled. This stapling operation includes a sequence of successive stages or steps shown clearly in Figs. 11 to 18, inclusive, in which the depending, clinching ends 43 of the staple driver 19 contours the staple 42, toes in the ends thereof and clinches it as therein shown. In this lowered position of the staple driver or stapling plate 19, the lower end of the strap 37 carrying the pin 38 to which the forward end of the actuating rod 35 is attached, contacts the upper edge 66 of the back plate 63 which forms a stop. Then raising of the handle 25, causes the anvil holder 21 to move in a counter-clockwise direction to withdraw the anvil tip 33 from beneath the top or connecting web of the embedded and clinched staple and the staple driver 19 is raised to its inoperative cocked position.

Figure 21:
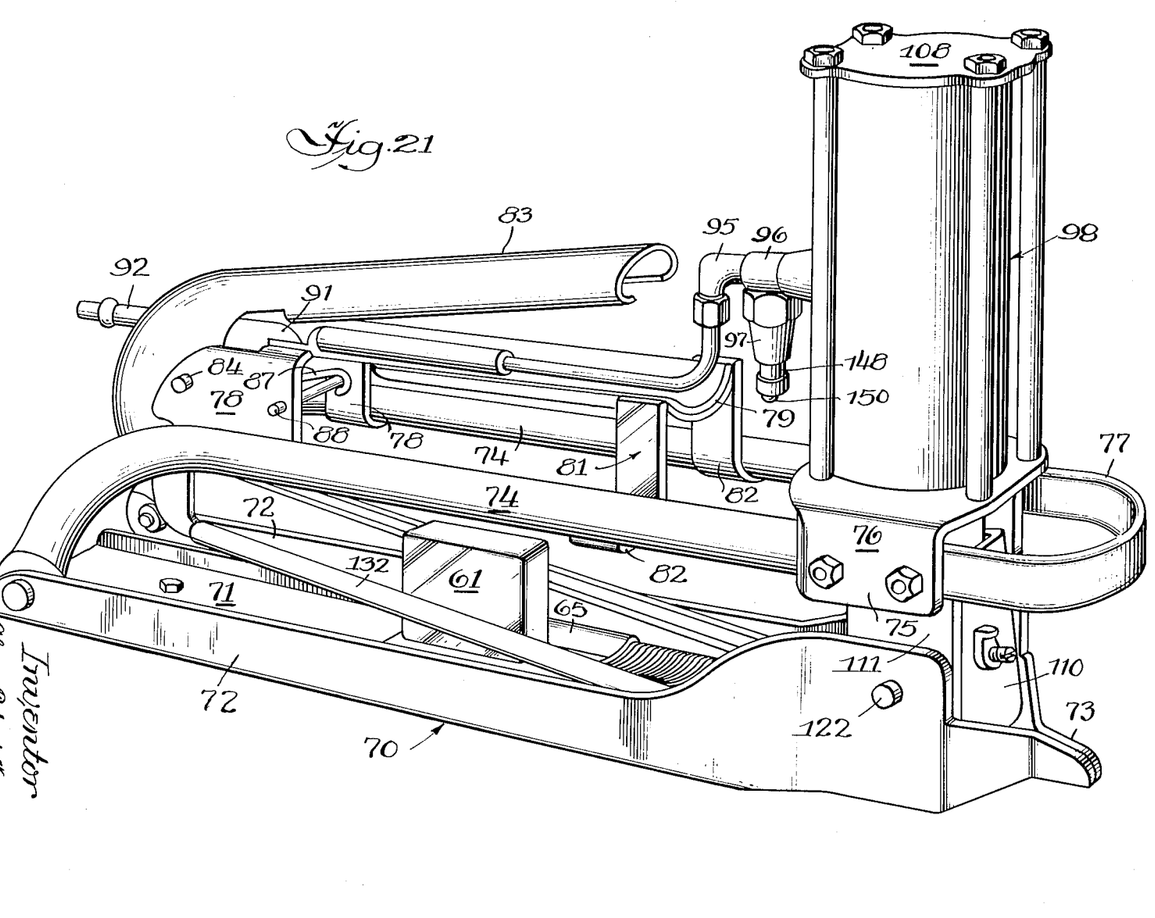
Fig. 21 is a view in perspective of my novel portable stapling machine designed and constructed for pneumatic operation.

Referring to the pneumatically operated stapling machine disclosed in Figs. 21 to 39, inclusive, as in the device of Figs. 1 to 20, inclusive, this device or machine is provided with a housing 70 having a base 71 provided with upstanding flanges 72 merging at the forward end 73 to provide a streamlined design. A frame composed of spaced tubular members 74 each having the rear end thereof connected or affixed to the rear of a flange 72 of the base and adjacent its forward end each tubular member 74 is secured to the opposite depending ends 75 of a base plate 76. The frame may be of substantially U-shape with a curved portion or extension 77 projecting forwardly from the depending ends 75 to provide a hand grasp and to protect the forward end of the machine. This may be a flat member as in Fig. 21, or a continuation of the tubular members 74 which may be somewhat flattened as in Fig. 22.

Affixed to each tubular arm 74 adjacent the rear of the machine is an upstanding plate 78 having its upper end formed or bent inwardly to receive and anchor therebetween one end of a section or member 79 of substantially arcuate shape or concaved in cross section and adapted to provide a hand grasp which conforms to the fingers of the hand when the machine is carried or transported about or when operating the device. The other or forward end of this arcuate member 79 is affixed at each side to and supported between the upstanding arm 81 of a pair of supporting brackets 82 rigidly secured adjacent their lower ends to the tubular members 74.

A handle 83 is pivotally mounted on a cross pin 84 journalled at its ends in the spaced upstanding plates 78. This handle operates the trip and air valve as later more fully disclosed, and is spring-biased to raised position by a spring 85 (Fig. 22) coiled about the pivot pin 84 and having one end 86 projecting into the hollow of and bearing against the underside of the handle. The other end 87 of the spring bears against a cross pin 88.

Disposed beneath the handle 83 is a knob or plunger 89 of a conventional air valve 91 connected through an inlet duct 92 to a supply tube 93 connected to a source of air or pneumatic fluid under pressure. This air or fluid enters the conventional air valve 91 and when the knob or plunger 89 is depressed, the valve is opened and air enters and passes through the valve and connecting tube 94, elbow 95, nipple 96, the latter carrying an air relief valve 97, and enters the interior of a cylinder 98.

This cylinder includes a plunger 99, carrying at its lower end a staple driver or stapler plate 101 by means of a transverse pin 102 projecting through an opening 100 in the upper end of the member 101. Secured to the plunger is a leather washer 103 having sealing and wiping contact with the interior of the cylinder and an eye stud bolt 104 bearing against a metal washer 105 and securing the body of the sealing leather upon the plunger. To the eye of this stud bolt 104 is attached one end of a tension spring 106 with the other end of the spring anchored to an eye 107 threaded or otherwise secured to and depending from the interior of a cylinder head 108.

Disposed beneath the base or end wall 76 of the cylinder is a housing 109 (Figs. 22, 28 and 30) for receiving and pivotally mounting therein another housing or casing 110 (Figs. 25 and 26) for enclosing trip mechanism and an anvil for the staples and with the end walls 111 thereof each provided with a channel or groove 112 forming guideways for receiving and guiding the vertical edges of the staple driver in its sliding movement from its elevated, inoperative or cocked position to its lowered, stapling position.

The trip mechanism comprises a dog or pawl 113 pivotally mounted upon a cross pin 114 and carrying a roller 115 at its upper end adapted to seat beneath the lower end of the plunger 99 and retain the plunger and the staple driver 101 in elevated, cocked position. The trip member is spring-biased rearwardly or toward the staple driver by means of a coil or compression spring 116 disposed above the pivot or pin 114 and bearing at one end against a spring-pressed detent 117 seating against the dog or pawl and with its other end received in an adjustment screw 118 carried in the rear wall 119 of the trip and anvil housing 110 for varying the tension on the dog or pawl 113. A trip adjustment screw 120 and locking nut 121 are also mounted in the rear wall 119 of the housing for adjusting the position of the dog or pawl.

The trip and anvil housing 110 is pivotally mounted in the housing 109 upon a cross pin 122 extending through aligned openings 122a in the housings 109 and 110. In the housing 110 is positioned an anvil 123 (Figs. 26 and 29) and a pair of compression springs 124 for retracting the anvil. This anvil comprises a transverse upper plate 125 against which one end of the springs 124 seat with the lower end of these springs seating against the base 126 of the housing and guided thereon by studs 124a, spaced anvil blades 127 each provided at its lower end with an outwardly and rearwardly projecting anvil tip 128 and adjacent its upper end with an ear 129. An ear 129 of each blade 127 projects into one of a pair of spaced vertical slots 130 in the staple driver 101, the latter being movable vertically over these ears. When the movable staple driver is depressed to the point where these ears reach the upper end of the slots 130, the staple driver 101 by its engagement with these ears and the lower end of the staple driver forcibly engaging the staple therebeneath, depresses the anvil 123 whereby the anvil tips 128 are forced downwardly into the upper surface of the cardboard or corrugated board being stapled at the end of the impact or stroke of the driver. These anvil blades 127 are removably held on the plate 125 by spaced pins 131 which permits their replacement when necessary.

Figures 22, 23:
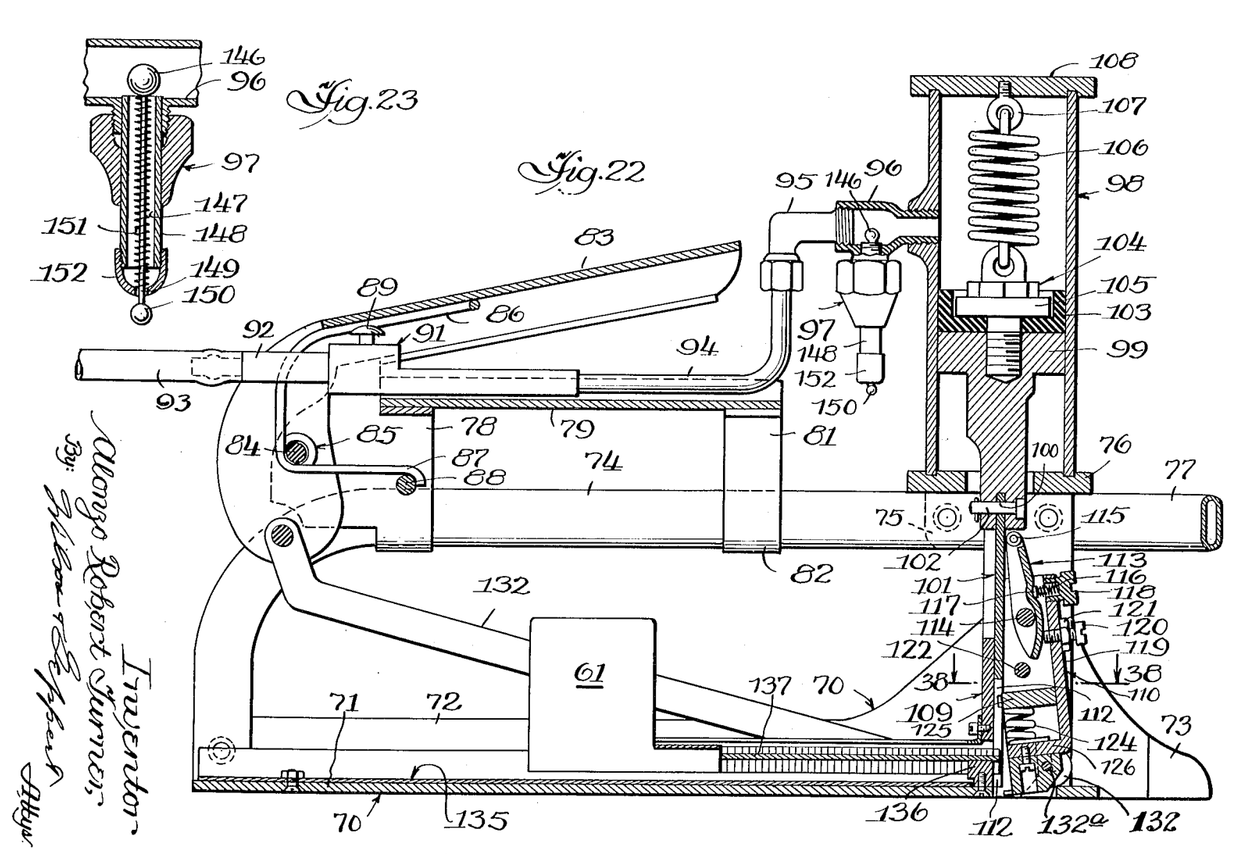
Fig. 22 is a vertical cross sectional view taken longitudinally through the machine of Fig. 21.
Fig. 23 is a view in vertical cross section taken through the air relief valve.
Figure 24:
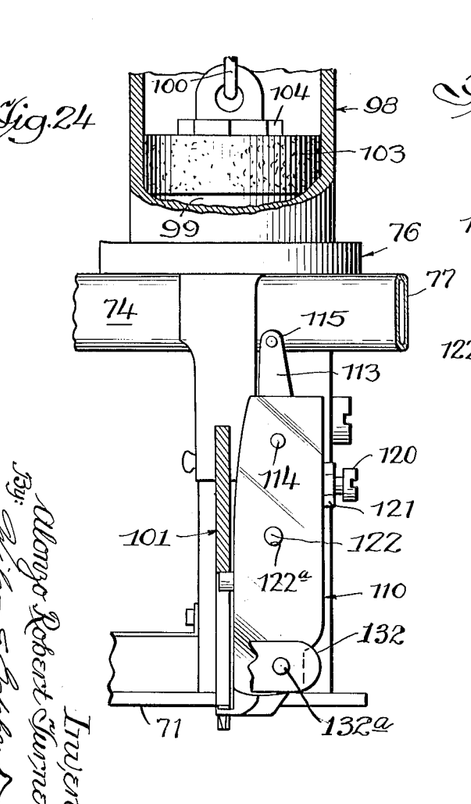
Fig. 24 is a fragmentary enlarged view, part in side elevation and part in vertical cross section, of the cylinder, its plunger and the stapler head assembly.
Figures 25, 26, 27, 28, 29:
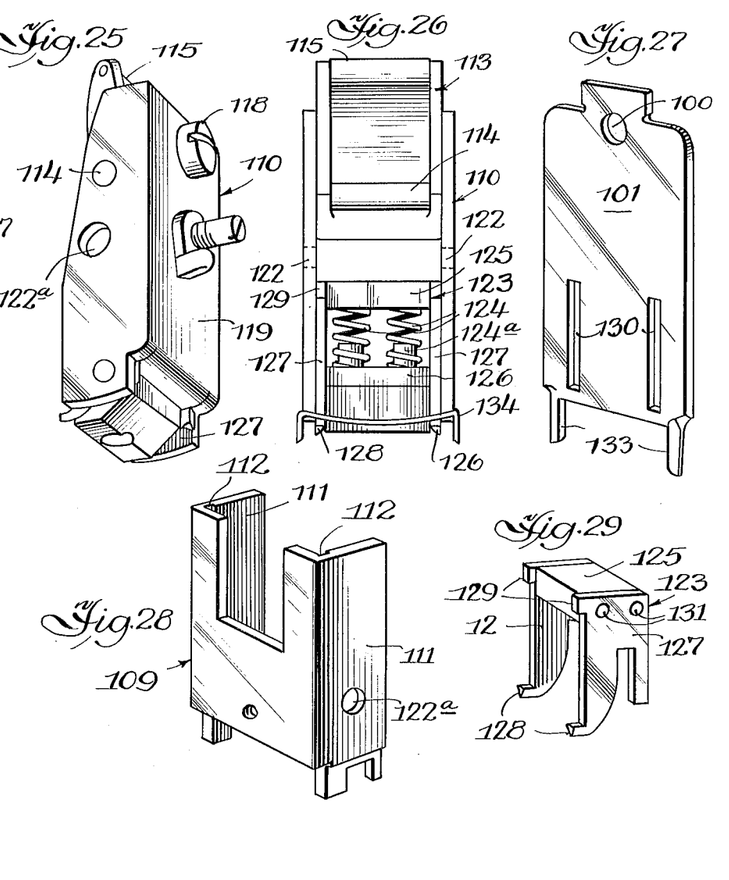
Fig. 25 is a view in perspective of the trip and anvil housing and associated parts.
Fig. 26 is a view in rear elevation of the trip and anvil housing and associated parts of Fig. 25, including the trip and roller assembly, the compression springs for retracting the anvil, the anvil blades and a staple in position to be embedded and clinched.
Fig. 27 is a view in perspective of the staple driver or stapling member.
Fig. 28 is a view in perspective of the housing for slidably receiving the staple driver of Fig. 27 and the trip mechanism, anvils and associated parts of Figs. 25 and 26.
Fig. 29 is a view in perspective of the anvil with its projecting tips.
Figure 30:
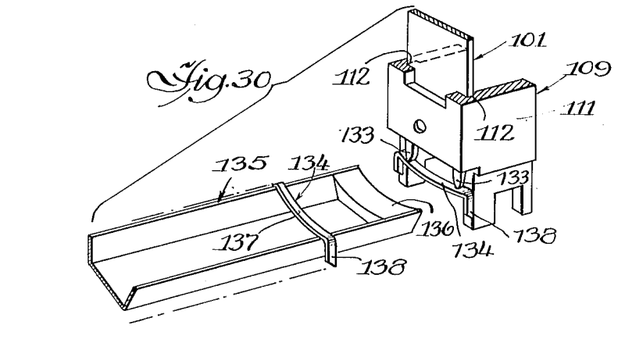
Fig. 30 is a perspective view showing the staple channel, housing and the staple driver in partially lowered position and in contacting engagement with an aligned staple, the staple channel being spaced apart for clearer disclosure.
Figure 31:
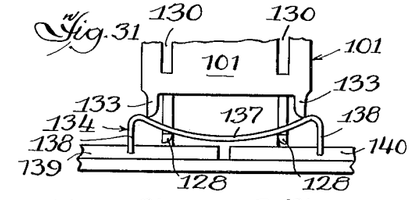
Figure 32:
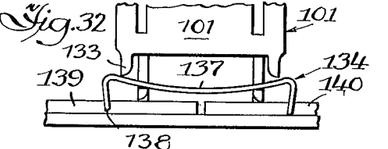
Figure 34:
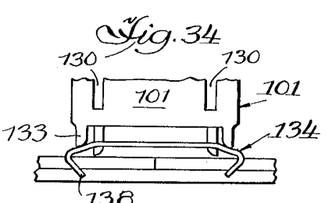
Figure 35:
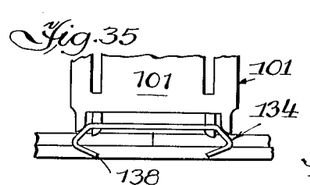
Figure 36:
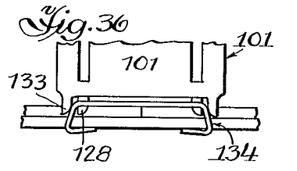

When the handle 83 is in elevated position, the staple driver 101 is elevated by the plunger 99 to the raised, inoperative position of Fig. 22 with the roller 115 seating beneath the lower end of the plunger. Then when the handle 83 is depressed and the trip or pull rods 132 are retracted, the initial movement of the handle causes the valve plunger 89 to be depressed and the valve 91 to be opened allowing the air or fluid under pressure to enter the chamber of the cylinder 98 and build up sufficient pressure therein to overcome the tension of the spring 106 and actuate the piston and plunger 99 when released upon withdrawing the roller 115. To withdraw the roller 115 as pressure is increased in the cylinder, the forward end of the trip or pull arms 132 are moved or pulled rearwardly by the pin 132ᵃ (Fig. 24) to pivot or swing the anvil and trip housing 119 about its pivot pin 122 and to swing or move the anvil tips 128 (Fig. 31) beneath the staple 134 and the vertically movable staple driver 101 and between the projecting ends 133 of this staple driver. Upon withdrawing the roller 115 of the trip mechanism from beneath the end of the plunger 99, and with sufficient air pressure in the cylinder, the staple driver 101 is forcibly impelled downwardly, thereby causing the staple driver to impact the staple and conform the staple 134 in the manner shown in Figs. 31 to 37 inclusive. The studs or pegs 124ᵃ (Fig. 26) upon which the springs seat and disposed beneath the upper plate 125 of the anvil, limit the depth to which the anvil tips 128 may be embedded in the cartons or containers by the staple driver 101 at the end of its impact stroke.

The staples are fed in a manner similar to that in Figs. 1 to 20 inclusive, except that an upwardly opening staple channel 135 is provided. This staple channel is suitably affixed in aligned relation in the base 71 of the support and at its forward end is provided with a solid back plate 136 (Figs. 22 and 30) rigidly attached thereto and conforming to the shape of the channel member. The staples 134 as originally formed or contoured before the stapling operation are bowed or concave across the top 137 thereof and with the depending legs or projections 138 extending vertically.

Figures 37, 41:
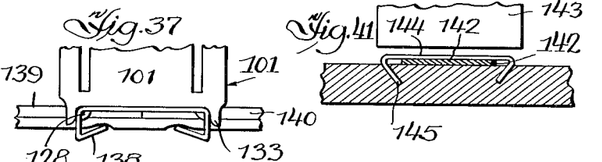
Figure 38:
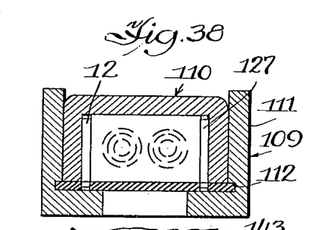
Fig. 38 is a view in horizontal cross section taken in a plane represented by the line 38—38 of Fig. 22.

In the stapling operation as clearly shown in Figs. 31 to 37 inclusive, the spaced projecting ends 133 of the staple driver 101 engage the upper or concaved surface 137 of the staple adjacent to but spaced inwardly from the ends thereof. Then with the undersurface of the staple engaged by and supported upon the anvil tips 128 which are disposed inwardly from the projecting ends 133 of the staple driver 101, the depending ends or pointed projections of the staple are directed inwardly and embedded and clinched in the material of the flaps or closure and adjacent surface of the container or carton being closed. Then as the staple driver 101 reaches the lowest point in its impact stroke as shown in Fig. 37, the handle 83 having been released and the trip arms 132 having moved the anvil tips 128 forwardly and outwardly from beneath the top or upper surface 137 of the staple, the staple driver at the end of its stroke embeds or countersinks the top of the staple into the container or carton so as to eliminate any projecting portion. These Figs. 31 to 37 show the manner of joining and anchoring the cover sections or flaps 139 and 140 of a carton or container and how they are drawn together to form a tight closure.

Figure 39:
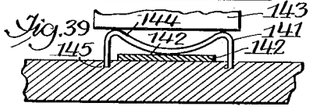
Figure 40:
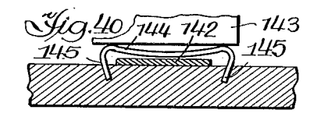

Figs. 39, 40 and 41 show a form of staple 141 admirably adapted for anchoring a steel strap 142, insulation, wire, etc. to wood, plywood, fibreboard, etc. In this form of stapler, the staple driver 143 is flat. This staple is originally bowed across its top 144 and with its depending legs or pointed ends 145 vertically disposed. Then as the flat end of the staple driver 143 impacts against the top 144 of the staple, the ends 145 are toed inwardly and embed in the wood in this inclined position. This tightly locks or anchors the staples in the wood and permits the use of legs or ends 145 of substantially less length than prior staples employed for this purpose, thus effecting a substantial saving in material and cost.

The relief valve assembly 97 shown for clarity in cross section in Fig. 23, permits the release of the pressure in the cylinder 98 after the stapling operation has been accomplished. When air or fluid under pressure is transmitted to the cylinder, an upper ball 146 of this valve seats upon and closes the port or passage 147 through a depending sleeve or tubular member 148. This ball 146 is fixed to the upper end of a stem 149 while a substantially smaller ball 150 is affixed to the lower end of the stem 149 at the exterior of the valve assembly. A compression spring 151 seats at its upper end against the upper ball 146 and at its lower end against an adjustable cup-shaped member or cap 152 threaded onto the threaded lower end of the sleeve or tubular member 148, whereby adjustment of the member 152 adjusts the compression on the spring. As the pressure is built up in the cylinder to actuate the plunger 99 and the staple driver 101, the top ball 146 is lowered and seals against the escape of any air or fluid under pressure through the sleeve or tubular member 148 and through the port in the base of the cap 152 through which the stem 149 projects. However, when the plunger is tripped and the stapling operation accomplished, this upper ball 146 is raised to allow the escape of the air or fluid through the discharge port in the sleeve 148 and cap 152 to relieve the pressure.

From the above description and the disclosure in the drawings, it will be evident that the present invention comprehends a novel portable stapling machine or apparatus which is manually controlled but in which the staple driver or plate which drives and clinches the staple is power actuated either through mechanical means or pneumatically, whereby tight interlocking engagement of the embedded staple is effected.

It will also be evident that the invention comprehends a novel cooperation between this staple driver and the anvil whereby the staple is countersunk in the stapling operation so that no portion thereof need project above the carton or container. This is a distinct advantage when the stapled cartons or containers are to be stacked or slid one over the other.

Although the drawings disclose several forms of staples, those shown in Figs. 30 to 41 inclusive, are of extreme importance and are so designed and constructed as to assure that the projecting ends or points of the staple are toed inwardly and driven into the material in which the staple is driven with an interlocking clinching action resulting in most effective retention.

Having thus disclosed the invention, I claim:

1. In a portable stapling machine for driving and clinching a staple, a housing, a vertically movable staple driver in said housing having spaced depending projections adapted to engage the upper surface of the staple at widely spaced points, means for restraining said driver in elevated position above the staple, power mechanism for impelling the driver against the staple with a heavy impact upon release of the latter from its restraining means, a pivotally mounted anvil in said housing, and manually actuated means for releasing the driver from its restraining means to permit the latter to be impelled against the staple with a heavy impact and for moving the anvil beneath the staple prior to such impact, said anvil being of substantially less width than the spacing between the projections on the staple driver to accommodate the thickness of the staple, and said projections when in lowered position extending beyond the anvil whereby the impact of the driver causes the staple to deform about the outer edges of the anvil and clinch its ends in the material to which the staple is applied.

2. In a portable stapling machine for driving and clinching a staple, a housing, a staple driver vertically slidable in said housing having spaced depending projections adapted to engage the upper surface of the staple at widely spaced points, an anvil holder pivotally mounted in the housing and carrying an anvil to be received beneath the staple when the latter is struck by the driver, tripping means for holding the driver in elevated position prior to the stapling operation, means for impelling said driver downwardly when the latter is released from its elevated position whereby it engages the staple with a heavy impact, and manually-actuated means for releasing the driver and for moving the anvil beneath the staple prior to such impact, said anvil being of substantially less width than the spacing between the projections on the staple driver to accommodate the thickness of the staple, and said projections when in lowered position extending beyond the anvil whereby the impact of the driver causes the staples to deform about the anvil and clinch its ends in the material to which the staple is applied.

3. A portable, pneumatically-operated stapling machine for driving a staple, comprising a vertically slidable staple driver for engaging a staple, pneumatically-actuated means carrying the driver and driving the latter onto the staple when actuated, said means including an air cylinder, a plunger in said cylinder adapted to be actuated when the pressure in the cylinder reaches a predetermined amount, means for releasably retaining the plunger and the driver in elevated and inoperative position, tripping mechanism for releasing the plunger and the driver from the retaining means for the stapling operation, an air supply line and an air valve for supplying the cylinder with air under pressure, a relief valve in the air supply line for relieving the pressure in the cylinder after the stapling operation, and manual control means for actuating the air valve and for actuating the tripping mechanism for releasing the plunger and the driver when sufficient pressure has built up in the cylinder.

4. A portable, pneumatically-operated stapling machine for driving a staple, comprising a supporting frame, a cylinder mounted upon the frame, a plunger in said cylinder adapted to be actuated when the pressure in the cylinder reaches a predetermined amount, a staple driver carried by the lower end of the plunger and adapted to engage a staple when in its lowered, stapling position, means for elevating the plunger and retracting the driver to elevated position, means for releasably retaining the plunger and driver in elevated position and ready to be released for the stapling operation, an air supply and air valve for supplying air under pressure to the cylinder and manually operable means for both operating the air valve and releasing the retaining means whereby to permit the plunger and the driver to be lowered with a heavy impact to drive the staple.

5. A portable, pneumatically-operated stapling machine for driving a staple into cardboard, corrugated board, fibre-board, wood, etc., comprising a vertically slidable staple driver for engaging a staple disposed therebeneath, pneumatic means including an air cylinder, a plunger in said cylinder carrying the driver, means for supplying air under pressure to the cylinder, tension means for suspending the plunger in the cylinder but permitting the plunger to impel the driver with a heavy impact when the pressure in the cylinder reaches a predetermined amount, means for releasably retaining the plunger and the driver in elevated position, and manual means for withdrawing the retaining means from below the plunger and releasing the plunger and the driver from their elevated position when the pressure reaches the predetermined amount, whereupon the driver is impelled downwardly against the staple.

6. In a portable stapling machine for driving a staple having a concaved upper surface and vertically depending legs, a staple driver adapted to be power-impelled into engagement with the upper surface of the staple and provided with spaced depending projections for engaging this upper surface at widely spaced points, and an anvil disposed beneath the upper surface of the staple at points spaced substantially inwardly of these projections, whereby impact of said projections tends to flatten the upper concaved surface and simultaneously toe inwardly the depending legs disposed between the adjacent surfaces on the anvil and projections and embed them in the material to which the staple is applied.

7. In a portable stapling machine for driving and clinching a staple, a housing, a staple driver slidably mounted in the housing and having spaced, depending driving projections, an anvil in said housing having a projecting part adapted to be moved beneath the staple and over which the staple is deformed upon impact by the driver, said projecting part having its opposite edges spaced inwardly of the driving projections of the staple driver and of the legs of the staple, means for pivotally mounting the anvil in said housing for swinging movement whereby the projecting part is moved into and out of contact with the staple, means for supplying an impact force to said driver for driving the staple over the projecting part of the anvil, means for restraining movement of the driver to prevent its impact of the staple, and manually-actuated tripping mechanism connected to the pivotal mounting of the anvil to move and locate the projecting part of the anvil beneath the staple and to trip and release the driver to permit the driver to impact and drive the staple.

8. In a portable stapling machine for driving and clinching a staple, a housing, a vertically movable staple driver in said housing, power mechanism for impelling the driver against the staple with a heavy impact, means for restraining movement of the driver to prevent its impact of the staple, a pivotally mounted anvil in said housing having a part movable beneath the staple, and manually operative means connected to and moving the anvil beneath the staple and for releasing the driver to permit the driver to drive the staple.

9. In a portable stapling machine for driving and clinching a staple, a housing, a vertically movable staple driver in said housing, power mechanism for impelling the driver against the staple with a heavy impact, a pivotally mounted anvil in said housing, means for restraining movement of said driver to prevent its impact of the staple, means connected to and moving the anvil beneath the staple and for releasing the driver to permit the driver to impact the staple, and means for returning the driver to its restrained position and the anvil to its inoperative position.

10. A portable pneumatically-operated stapling machine for driving a staple, comprising a housing, a vertically slidable staple driver in said housing for engaging an aligned staple, an anvil swingably mounted in the housing and received beneath the staple when the latter is engaged by the driver, pneumatic means including an air cylinder, a plunger in said cylinder carrying the driver, means for elevating the plunger and retracting the driver to elevated position, means for releasably retaining the plunger and driver elevated, an air supply and air valve for supplying air under pressure to the cylinder, and manually operable means for moving the anvil beneath the staple, operating the air valve and releasing the retaining means, whereby the plunger and driver are lowered with a heavy impact to drive the staple.

11. In a portable stapling machine for driving and clinching a staple having depending legs, a staple driver in the form of a rigid plate having two spaced and depending clinching ends, means for applying a heavy impact to said plate to cause the clinching ends to engage the upper surface of the staple inwardly of its ends, an anvil of less width than the clinching ends moved beneath the upper surface of the staple, and means for moving the anvil beneath the staple and for releasing the means for applying an impact to the plate, whereby the depending clinching ends engage and deform the staple between these ends and the adjacent and inwardly spaced opposite edges of the anvil and cause the depending legs of the staple to be embedded in the material to which the staple is applied.

12. In a portable stapling machine for driving and clinching a staple having depending legs, a staple driver in the form of a rigid plate having two spaced and depending clinching ends to engage the upper surface of the staple inwardly of its ends, means for applying a heavy impact to said plate whereby the clinching ends deform the ends of the staple, an anvil mounted in the machine for pivotal and longitudinal movement with respect to the driver and provided with spaced laterally projecting tips moved beneath the upper surface of the staple and spaced inwardly of the clinching ends of the staple driver as the impact is applied to the plate, and means for moving the anvil beneath the staple and for releasing the means for applying an impact to said plate, whereby the depending clinching ends deform the staple about the tips of the anvil and between these tips and the clinching ends of the staple driver and cause the depending legs of the staple to become embedded in the material to which the staple is applied.

13. In a portable stapling machine for driving a staple having a preformed, curved upper surface and straight depending legs, a staple driver for engaging the upper surface of the staple adjacent the ends thereof, an anvil movable to a position beneath the curved upper surface of the staple, means for moving the anvil beneath the staple and for releasing the staple driver, and means for applying a heavy impact to said driver for driving the staple into a member to be stapled, said driver upon striking the upper surface of the staple adjacent the ends thereof with the anvil beneath the staple causing this surface to be flattened whereby the depending legs are toed inwardly and embedded and clinched in said member.

14. In a portable stapling machine for driving and clinching a staple, an operating head, a vertically movable staple driver in said operating head, power mechanism for impelling the driver against the staple with a heavy impact, means for restraining movement of the driver to prevent its impact of the staple, a pivotally mounted anvil in said operating head having a part movable beneath the staple, and manually operative means connected to and moving the anvil beneath the staple and for releasing the driver to permit the driver to drive the staple.

15. In a portable stapling machine for driving and clinching a staple, a depending and vertically movable staple driver for engaging the upper surface of the staple, means for supplying a heavy impact to said staple through said driver, a pivotally mounted anvil, means for supporting and restraining the driver in elevated position and ready to be dropped onto the staple, means for moving the anvil beneath the driver and staple and for releasing the driver to impact the staple, and means for returning the driver to its restrained position and to remove the anvil from beneath the driver.

References Cited in the file of this patent

UNITED STATES PATENTS

| | | |
|---|---|---|
| 1,757,812 | Polzer | May 6, 1930 |
| 1,900,683 | Allen | Mar. 7, 1933 |
| 1,910,688 | Goodstein | May 23, 1933 |
| 1,945,377 | Posnack | Jan. 30, 1934 |
| 1,958,739 | Bliss | May 15, 1934 |
| 2,008,086 | Sorenson | July 16, 1935 |
| 2,066,157 | Pankonin | Dec. 29, 1936 |
| 2,142,782 | Gillette | Jan. 3, 1939 |
| 2,158,242 | Maynard | May 16, 1939 |
| 2,178,354 | Brownstein | Oct. 31, 1939 |
| 2,185,518 | Posnack | Jan. 2, 1940 |
| 2,392,327 | Lang | Jan. 8, 1946 |
| 2,427,028 | Spencer | Sept. 9, 1947 |
| 2,440,479 | Lang | Apr. 27, 1948 |
| 2,482,993 | Walker | Sept. 27, 1949 |